(12) United States Patent
Jacob et al.

(10) Patent No.: US 7,470,761 B2
(45) Date of Patent: Dec. 30, 2008

(54) PROTON-CONDUCTIVE MEMBRANES AND LAYERS AND METHODS FOR THEIR PRODUCTION

(75) Inventors: Stéphane Jacob, Würzburg (DE); Lothar Fröhlich, Würzburg (DE); Konrad Olma, Höchberg (DE); Michael Popall, Würzburg (DE); Frank Kahlenberg, Brilon (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 461 days.

(21) Appl. No.: 11/208,553

(22) Filed: Aug. 23, 2005

(65) Prior Publication Data

US 2006/0058485 A1  Mar. 16, 2006

Related U.S. Application Data

(62) Division of application No. 10/324,079, filed on Dec. 20, 2002, now Pat. No. 6,949,616.

(30) Foreign Application Priority Data

Dec. 21, 2001  (DE) ................. 101 63 518

(51) Int. Cl.
 *C08F 30/08* (2006.01)
(52) U.S. Cl. .................. 526/279; 528/27; 528/32; 528/38; 524/588
(58) Field of Classification Search .......... 528/27, 528/32, 38; 524/588; 526/279
See application file for complete search history.

(56) References Cited

U.S. PATENT DOCUMENTS

| | | | |
|---|---|---|---|
| 3,863,417 A | 2/1975 | Franchi | |
| 4,382,999 A | 5/1983 | Harima et al. | |
| 4,505,985 A | 3/1985 | Schmidt et al. | |
| 4,716,091 A | 12/1987 | Yoshihara et al. | |
| 5,096,942 A * | 3/1992 | Long et al. | 523/212 |
| 5,283,310 A | 2/1994 | Armand et al. | |
| 5,525,436 A | 6/1996 | Savinell et al. | |
| 5,656,386 A | 8/1997 | Scherer et al. | |
| 5,705,561 A | 1/1998 | Kozakiewicz et al. | |
| 5,716,727 A | 2/1998 | Savinell et al. | |
| 5,981,097 A | 11/1999 | Rajendran | |
| 5,985,942 A | 11/1999 | Steck et al. | |
| 5,994,426 A | 11/1999 | Nezu et al. | |

FOREIGN PATENT DOCUMENTS

JP  02-042448  2/1990

OTHER PUBLICATIONS

F. N. Buchi et al., "Performance of Differently Corss-Linked, Partially Fluorinated Proton Exchange Membranes in Polymer Electrolyte Fuel Cells," J. Electrochim. Soc. 142 (1995) 3044.
L. Depre et al., "Organic-Inorganic Hybrid Protonic Polymeric Electrolytes Grafted By Sulfonic Acid/Sulfonamide Moieties," Mat. Res. Soc. Symp. Proc. 575(2000) 253.
L. Depre et al., "Proton Conduction Sulfon/Sulfonamide Functionalized Materials Based on Inorganic-Organic Matrices," Electrochim. Acta 45 (2000), 1377-1383.
L. Depre et al., "Inorganic-Organic proton conductors based on alkylsulfone functionalities and their patterning by photoinduced methods," *Electrochimica Acta*, vol. 43, Nos. 10-11, pp. 1301-1306, 1998.
K. D. Kreuer et al., "Imidazole and Pyrazole-based Proton Conducting Polymers and Liquids," Electrochim. Acta 43 (1998), 1281.
L. Popall et al., "Inorganic-Organic Copolymers as Solid State Ionic Conductors with Grafted Anions," *Electrochimica Acta,* vol. 40, No. 13-14, pp. 2305-2308, 1995.
X. Ren et al., "Water and Methanol Transport in Membranes for Direct Methanol Fuel Cells," Polym. Mater. Sci. Eng. 80(1999), 601.
X. Ren et al., "High Performance Direct Methanol Polymer Electrolyte Fuel Cells," J. Electrochim. Soc. 143 (1996), L12-L15.
Schoolmann et al., "Properties and Application of a Proton Conducting Polymer: The BPEL, $\chi H_3PO_4$ System," Electrochim. Acta 37 (1992) 1619-21.
J. S. Wainright et al., "Acid-Doped Polybenzimidazoles: A New Polymer Electrolyte," J. Electrochim. Soc. 142 (1995), L121-L123.

* cited by examiner

*Primary Examiner*—Kuo-Liang Peng
(74) *Attorney, Agent, or Firm*—Hunton & Williams LLP (57) ABSTRACT

This invention relates to a silane-resin composition that can be obtained by at least partial hydrolytic condensation of at least the following components: (1) one or more sulfonic acid group-containing silane(s) with at least one group that can be cleaved under hydrolytic conditions, (2) one or more styryl-functionalized silane(s) and (3) one or more silane(s) that carry a nitrogen-containing heterocyclic compound, an amine group or a sulfonamide group with at least one group that can be cleaved under hydrolytic conditions, and mixing of the components before, during or after the hydrolytic condensation, as well as a process for the production of this composition. With the silane resin that is obtained, proton-conductive, organically cross-linked heteropolysiloxanes can be produced that are suitable for PEMFC in a layer or membrane form as proton-conductive systems. Their proton conductivity can be further increased by the addition of suitable liquids.

14 Claims, 5 Drawing Sheets

PROTON-CONDUCTIVE MEMBRANES AND LAYERS AND METHODS FOR THEIR PRODUCTION

CROSS-REFERENCED RELATED APPLICATIONS

This application is a divisional of U.S. patent application Ser. No. 10/324,079, filed Dec. 20, 2002 now U.S. Pat. No. 6,949,616, the entire contents of which are incorporated herein by reference.

This application claims priority to German Application Number 101 63 518.4 filed Dec. 21, 2001, which is hereby incorporated by reference.

This invention relates to proton-conductive layers, especially membranes, that are based on co-condensed styryl- and sulfonyl-functionalized alkoxysilanes as well as a process for the production of such layers/membranes.

Interest in polymer electrolyte-membrane-fuel cells (PEMFC) for mobile applications has greatly increased in recent years. Most PEM-fuel cell systems still use polymer electrolytes that are part of the Nafion® family of perfluorinated, sulfonated ionomers produced by Du Pont of Nemours. The class of perfluorinated, sulfonated materials also includes Flemion™ of Asahi Glass and Aciplex™ of Asahi Chemical. In 1987, a fuel cell with improved PEMFC output was developed by Ballard Advanced Materials Corp. using a membrane made by the Dow Chemical Company. It was similar to the Nafion® membrane but had a shorter side chain, in which the $SO_3H$ portion and thus the conductivity of the polymer were increased. At the same time, Du Pont attempted to increase the value of its membrane by reduction of the membrane thickness and an increase of the $SO_3H$ portion. These polymers, however, are still expensive to produce which prevents mass production.

The literature discusses several different polymer developments which attempted to eliminate the high cost of production and allow for mass production. A possibility of reducing cost is the production of a partially fluorinated polymer. Thus, at the end of the 1980's, e.g., Ballard started a program for developing economical polymer electrolytes for fuel cell applications. This resulted in a polymer composite, based on sulfonated $\alpha,\beta,\beta$-trifluorostyrene and polytetrafluoroethylene (see, e.g., U.S. Pat. No. 5,985,942 and others). During the 1990's, Hoechst AG developed sulfonated poly(aryl ether ketones) (EP 574791 A1); but the output of the fuel cells with such membranes was still too low. Another technique to develop proton-exchanger membranes is based on the coupling of styrene (U.S. Pat. Nos. 5,994,426 and 5,656,386, F. N. Büchi et al., J. Electrochem. Soc. 142, (1995) 3044) or $\alpha,\beta,\beta$-trifluorostyrene (WO 99/24497) with a fluorinated polymer, such as polytetrafluoroethylene, and the subsequent sulfonation of the polymer. The electrochemical and mechanical properties of these membranes are inadequate, however, and must still be improved for use in fuel cells.

In the case of direct-methanol-fuel cells (DMFC) with Nafion membranes, in addition to the cost problems, there is the problem that Nafion only allows an operating temperature of at most 90° C. At higher temperatures, the membranes lose the water that is complexed in the —$SO_3H$ groups, which results in a reduction of proton conductivity. In addition, these membranes have a high methanol crossover (i.e., methanol permeability). Therefore, they are not well suited for DMFC applications.

To reduce this problem, a whole series of anhydrous polymer-proton conductors was developed in recent years, the conductors are produced by complexing different polymers with strong acids, such as sulfuric acid or phosphoric acid. This category includes polymers, e.g., poly(ethylenimines), see, D. Schoolmann et al., Electrochim. Acta 37 (1992), 1619, and poly(benzimidazoles), see, U.S. Pat. Nos. 5,716,727, and 5,525,436, J. S. Wainright et al. in "New Materials for Fuel Cell Systems II, O. Savadogo and P. R. Roberge Eds., 1997, 808, and J. S. Wainright et al., J. Electrochim. Soc. 142 (1995), L121. The thermal stability and the redox stability, however, are often limited because of the high acid concentration and the oxidation potential of the acids. Also, it was attempted, i.a., to improve the Nafion membrane by the use of a three-layer membrane (U.S. Pat. No. 5,981,097) or by an optimized catalyst layer (X. Ren et al., Polym. Mater. Sci. Eng. 80 (1999), 601, X. Ren et al., J. Electrochem. Soc. 143 (1996), L12) for the methanol oxidation.

At the end of the 1990's, new systems were studied in which the strong acids were replaced by, e.g., sulfonated poly(aryl ether ketones) and heterocyclic compounds, such as imidazoles or pyrazoles (K.-D. Kreuer et al., Electrochim. Acta 43, 1281 (1998). The latter molecules play the role of a solvent for the acidic protons of the polymers. Good proton conductivity can therefore be achieved with systems that consist of such heterocyclic compounds and proton-conducting polymers.

In addition, proton-conducting, inorganic-organic polymers have been produced based on silanes (ORMOCER®e) that are hydrolytically condensed and polymerized via organic groups, in which sulfonated and sulfonamide-containing groups are bonded into the inorganic network (see L. Depre, et al., Mat. Res. Soc. Symp. Proc. 575 (2000) 253 and L. Depre et al., Electrochim. Acta 45 (2000), 1377). This was achieved using a mixture of functionalized alkoxysilanes with sulfonated groups, e.g., (3-sulfonyl)-1-propenyltrimethoxysilane, alkoxysilanes with sulfonamide groups, e.g., (2-(4-sulfamoylphenyl)-ethyltrimethoxysilane and alkoxysilanes with polymerizable organic groups such as the epoxy group in 3-(glycidoxypropyl)methyldimethoxysilane (GLYMO). A hydrolytic condensation, followed by an organic polymerization, resulted in the proton-conducting membrane. This produced a membrane with a conductivity of $1.4 \cdot 10^{-2}$ S/cm (12% water, room temperature). These membranes, however, lose their conductivity above 90° C. and show little redox stability, a basic requirement for fuel cell membranes.

SUMMARY OF THE INVENTION

The invention provides a proton-conducting layer/membrane with excellent conduction properties. The layer/membrane is capable of operating at temperatures above 90° C., and has improved redox stability. In a preferred embodiment, the invention provides membranes that show good conductivity properties at temperatures in the range of about 140° C.

DETAILED DESCRIPTION

It has been shown according to the invention that layers or membranes based on hydrolytically condensed silanes can have good conductivity properties at temperatures that are clearly above 90° C. if they contain styryl-functionalized silanes as network formers. The latter have proven to be both more temperature-stable and more redox-stable than previous network formers.

Styryl silanes are known from their use in color particles, oxygen-permeable membranes or electrophotographic materials. In a preferred embodiment, the syrryl silane used is a styrylalkoxysilane. However, the synthesis of these compounds was previously below a yield of 40%, since the vinyl group during synthesis tends toward polymerization reactions, and by-products are formed. It has been possible for the inventors, however, to improve the exploitation of this process considerably. In this case, styryl-functionalized silanes are synthesized via a Grignard reagent, whereby the process proceeds in two separate steps with use of chlorine-free alkoxysilanes as silane starting components. It is essential in this case that the production of the Grignard compound be carried out in the absence of silane, specifically for suppressing the vinyl group polymerization at temperatures of between about 40-55° C. The solvent that is used comprises ether with tetrahydrofuran in the mixing ratio of 30:70 to 70:30 (v:v), preferably 50:50 to 60:40. In a preferred embodiment the solvent consists of essentially ether with tetrahydrofuran in the above stated ratios. The subsequent reaction of the Grignard compound with the silane that is selected as an educt should be carried out at temperatures that are not above 20° C., preferably not above 15° C., whereby the same or a similar solvent can be used, and the temperature can be increased to about 40° C. only after the majority of the reaction batch has been reacted to complete the reaction.

The layers/membranes according to the invention are formed from at least three components, namely from (1) sulfonic acid group-containing silanes, (2) styryl-functionalized silanes, and (3) at least one nitrogen-containing heterocyclic compound, an amine group or silanes that carry a sulfonamide group. All three components can consist of one or more silanes of the above-mentioned type. In addition, other components can be present.

At least the silanes that are mentioned above under (1) and (3) have at least one group that can be cleaved under hydrolytic conditions, so that the compounds are accessible to a hydrolytic condensation.

The sulfonic acid group-containing silanes that can be used for the invention are preferably selected from the silanes of formula (I):

in which P has the meaning of HOSO$_2$—R—, in which R is or comprises an aliphatic or aromatic organic radical, preferably an optionally substituted alkylene, alkenylene or phenylene group; R$^1$ represents a group that is bonded via carbon to silicon, e.g., optionally substituted alkyl, alkenyl, alkinyl, aryl, alkylaryl or arylalkyl; X is a group that dissociates off under hydrolytic conditions; a is 1 or 2; b is 0, 1 or 2; and a+b together are 1, 2 or 3. P is bonded via radical R, preferably via an existing alkylene, alkenylene or phenylene group, to silicon; if R is an aliphatic group, the latter preferably has 1-6 carbon atoms, more preferably 2-4 carbon atoms. In a preferred embodiment R is propylene or propenylene. R$^1$ can be, e.g., methyl, ethyl, a propyl radical (n- or iso-) or a butyl radical (n-, iso- or t-). The hydrolysis-sensitive radical X can be hydrogen, halogen, alkoxy, aryloxy or NR$^2{}_2$ with R$^2$ equal to hydrogen or lower alkyl and is preferably C$_1$-C$_{12}$-alkoxy, quite especially preferably C$_1$-C$_4$-alkoxy. In a preferred embodiment, a is 1, and b is 0.

The styryl group-containing silanes of this invention are preferably selected from those of general formula (II)

in which (St) is a facultatively substituted styryl radical; R$^1$ is a group that is bonded via a carbon atom to silicon, for example optionally substituted alkyl, alkenyl, alkinyl, aryl, alkylaryl or arylalkyl; X is a hydrolysis-sensitive radical; a means 1, 2 or 3; b means 0, 1, 2 or 3; and a+b together are 1, 2, 3 or 4. (St) can optionally be substituted with a group that is bonded via carbon, for example, alkyl, aryl, alkylaryl or arylalkyl. In preferred embodiments, a+b is not more than 3, i.e., the silane of formula (II) contains one (or else more) hydrolyzable group X. In these cases, the styryl group-containing silane can be co-condensed with one silane(s) or another. In addition, (St)p-vinylphenyl is preferred. R$^1$ can be, e.g., methyl, ethyl, a propyl radical (n- or iso-) or a butyl radical (n-, iso- or t-) and is preferably methyl or ethyl. Radical X that can be hydrolyzed off can be hydrogen, halogen, alkoxy, aryloxy or NR$^2{}_2$ with R$^2$ equal to hydrogen or lower alkyl and is preferably C$_1$-C$_6$-alkoxy, quite especially preferably C$_1$-C$_4$-alkoxy. In a preferred embodiment, a is 1 or 2, and b is 0 or 1.

The silanes that carry at least one nitrogen-containing heterocyclic compound, an amine group or a sulfonamide group are preferably selected from those of general formula (III)

in which radicals R$^1$ and X and indices a and b are defined as for formula (I); (Q) can be Het-R— or NH$_2$SO$_2$—R— or NHR$^2$—R—,whereby R and R$^2$ are defined above as for formula (I), and Het is a nitrogen-containing heterocyclic compound in the ring. Radical R of group Q is preferably bonded via an existing alkylene, alkenylene or phenylene group to silicon; if R is an aliphatic group, the latter preferably has 1-6 carbon atoms, more preferably 2-4 carbon atoms. In a preferred embodiment R is propylene or propenylene. R$^1$ can be, e.g., methyl, ethyl, a propyl radical (n- or iso-) or a butyl radical (n-, iso- or t-). (Het) can be, for example, a five- or six-membered ring, which contains one or two nitrogen atoms or a nitrogen atom and an oxygen atom or a sulfur atom. Condensed ring systems are also possible. The nitrogen atoms can be present as —N═groups or as —NR$^3$ groups with R$^3$ preferably equal to hydrogen. Examples of suitable heterocyclic compounds are pyrrole or imidazole. The hydrolysis-sensitive radical X can be hydrogen, halogen, alkoxy, aryloxy or NR$^2{}_2$ with R$^2$ equal to hydrogen or lower alkyl and is preferably C$_1$-C$_{12}$-alkoxy, and more preferably C$_1$-C$_4$-alkoxy. In a preferred embodiment, a is 1 and b is 0.

The silanes that are described above may be combined in any sequence and optionally can be hydrolyzed and condensed in the presence of other components such as, e.g., silanes of formula (IV)

in which X has the meaning that is indicated for formula (I) above, R$^4$ is optionally substituted alkyl, alkenyl, alkinyl, aryl, alkylaryl or arylalkyl and a is 0 to 4, and/or compounds of formula (V)

in which M is a metal that can form alkoxy groups in aqueous systems, especially Ge, Sn, Pb, Ti or Zr, whereby c is 4, or B or Al, whereby c means 3, and $R^5$ represents an alkyl or alkenyl, preferably a $C_1$-$C_4$ alkyl, whereby usually a catalyst is added. In addition, other additives such as fillers, pigments, polymerization initiators (e.g., for a UV- or a thermally-initiated polymerization), etc. can be added as needed.

In one embodiment, it is preferred that silanes (1) and (3) first are at least partially hydrolyzed separately and then are mixed with one another once thoroughly condensed. Component (2), i.e., the styryl-functionalized silane(s), can either also optionally be separately hydrolyzed/condensed and then mixed only with the condensates of (1) and (3); but it is preferred that this component be added either to one or, more preferably, both of components (1) and (3) in portions and optionally co-hydrolyzed and co-condensed with the latter.

Consequently, preferably a first solution (A) is produced by a hydrolytic condensation that preferably occurs in the acid range (sol-gel process) with use of at least one sulfonic acid group-containing silane and at least one styryl group-containing silane, which preferably has at least one hydrolyzable group. Also, a second solution (B) is obtained by hydrolytic condensation (sol-gel process), specifically with use of at least one silane that carries a nitrogen-containing heterocyclic compound, an amine group or a sulfonamide group as well as a silane that has the same or a different styryl group and that also preferably contains at least one hydrolyzable group X as mentioned for (A), optionally in the presence of other components. The hydrolysis/condensation of this component (B) is preferably catalyzed in a basic manner. The hydrolytic condensation of both systems is generally carried out in a suitable solvent, e.g., an alcohol such as methanol, in which water can be admixed. The two hydrolytically condensed components are mixed, and the resulting solution is preferably stirred for a while longer.

In an alternative, also preferred embodiment of the invention, the silane comprising one or more sulfonic acid groups first is at least partly hydrolyzed and condensed. Next, the styryl-functionalized silane and the silane comprising a nitrogen containing heterocycle, an amine function or a sulfonamide function are added, together with the amount of water as required for partly or, more preferred, full hydrolysis and co-condensation.

The hydrolytic condensation preferably conducted for a range of several hours to one or more days.

In many cases, it is especially advantageous if the number of sulfonic acid groups and that of the sulfonamide, amine or heterocyclic compound-nitrogen groups (the latter, if they are basic) in the mixture to be approximately equal, or else the number of sulfonic acid groups predominates, since the sulfonic acid groups act as proton donors, and the sulfonamide, amine and the basic heterocyclic compound-nitrogen groups act as proton acceptors. The layer that is produced from these components thus acts in a proton-conducting manner. The amount of styryl groups is selected based on the desired mechanical properties of the membrane that is to be produced. For example, an amount of 20-60 mol %, relative to the amount of silicon atoms, is suitable. A preferred amount of styryl groups is 30-50 mol %, with about 40 mol %, being most preferred.

After the condensation has been completed, existing solvent is optionally removed, e.g., distilled off. If it is necessary, solvent can also be added, or a solvent exchange can take place. In a suitable way, the resulting resin has a viscosity that allows it to be poured into molds or forms, e.g., Teflon or aluminum molds, or spread out/stretched on substrates. In such a form, it can advantageously be hardened by thermal or UV-polymerization of the styryl groups. Polymerization may be accomplished through UV, thermal, combinations thereof or other procedures known in the art. For UV polymerization, photo-initiators such as Irgacure 369 can be used, and for thermal polymerization, thermal initiators such as dibenzoyl peroxide can be used. In the case of thermal polymerization, starting from about 70° C., an initiator can also be eliminated, since starting from about 50° C., reactive radicals of the styryl groups begin to form. Thermal curing not only begins the polymerization, but also is useful in evaporating the solvent residues which may still be present. Thus, thermal curing, alone or in combination with UV polymerization, may be especially well suited for certain embodiments. The resulting resin may be stored until required under suitable conditions, for instance −20° C.

The conductivity of the layers or membranes produced may also have improved conductivity-increasing substances, which can be used as vehicles for the proton transport on or through the layer or membrane, are added to them before or after the cross-linking. Examples of this are substances such as water or imidazole that can play the role of a solvent for acid protons. Other examples can be found, for example K. D. Kreuer et al., Electrochimica Acta 43, 1281 (1998). Many of these liquids, e.g., water, can be adsorbed from the layer or film that has already been thoroughly organically polymerized. It can therefore be added, as desired, before or after the organic polymerization. Other substances, e.g., imidazole, are taken up or stored from the finished layer or membrane only gradually or not at all, herefore it is recommended addition to the silane-resin composition occur before the organic polymerization. In preferred embodiments of the invention, the layer or membrane therefore provides the opportunity to adsorb water, e.g., in the form of atmospheric moisture, or imidazole which is added before, during or after the solvent that is used for the hydrolysis/condensation is removed and before an organic cross-linking takes place.

The below examples are meant to further illustrate the invention and should not be viewed as limiting the scope or spirit of the invention.

EXAMPLES

Example 1

Synthesis of p-Vinylphenylmethyldiethoxysilane

In a three-neck flask under argon and while being stirred mechanically, 11.7 g (480 mmol) of magnesium chips and some iodine crystals in 40 ml of a solution A (55% diethyl ether, 45% tetrahydrofuran) are mixed together. Then, a solution of 80.0 g (436 mmol) of bromostyrene, dissolved in 210 ml of solvent mixture A, is slowly added in drops, and thus a continuous exothermic reaction is achieved. The solution is stirred under reflux. After the end of the exothermic reaction, the reaction mixture is cooled to 2° C., and then 155.5 g (872 mmol) of methyltriethoxysilane in 160 ml of dry diethyl ether is added; the temperature must not exceed 15° C. After the end of the substitution reaction, stirring is continued at room temperature overnight. Approximately 200 ml of n-heptane is then added, thus the magnesium salts precipitate. The latter are filtered off, $9.7 \cdot 10^{-2}$ g (0.44 mmol) of 2,5-di-tert-butyl-hydroquinone is added to the filtrate, the solvent is drawn off in a rotary evaporator, and the residue is distilled in fractionated form under vacuum. 72.5 g (307 mmol) of the product was obtained with a yield: 70.3%, and a boiling point of 65-66° C. (0.05 mbar)

Example 2

Synthesis of p-Vinylphenyltrimethoxysilane, Bis-(p-vinylphenyl)-dimethoxysilane and Tris-(p-vinylphenyl)-methoxysilane Styryl magnesium bromide is produced as in Example 1. Then, 39.9 g (262 mmol) of tetramethoxysilane in 80 ml of dry diethyl ether is added to the cold solution (2° C.) of the Grignard reagent. After the addition, the batch is heated for one and one-half hours to 45° C., thus the substitution proceeds fully, and then it is stirred overnight at room temperature. The batch is worked up as in Example 1. After the solvent is removed, 105.3 g of a light yellow mixture is obtained. $^{29}$Si—NMR-spectroscopy shows that the crude product contains p-vinylphenyltrimethoxysilane, bis-(p-vinylphenyl)-dimethoxysilane and tris-(p-vinylphenyl)-methoxysilane.

The mono- and di-substituted alkoxysilanes are separated by distillation from the crude product and purified:

15.8 g (70.5 mmol) of vinylphenyltrimethoxysilane (mono-substituted alkoxysilane), yield 34.9%, boiling point: 59-60° C. (0.03 mbar)

24.5 g (82.8 mmol) of bis-(p-vinylphenyl)-dimethoxysilane (disubstituted alkoxysilane), yield: 41.0%

Total yield: 75.9%

In addition, tris-(p-vinyl-phenyl)-methoxysilane could be detected by spectroscopy in the residue.

Example 3

Synthesis of a Proton-conductive Membrane

| | | |
|---|---|---|
| A | (3-Sulfonyl)-1-propenyltrimethoxysilane | 1.1 g ($4.5 \cdot 10^{-3}$ mol) |
| B | p-Vinylphenylmethyldiethoxysilane | 0.71 g ($3.0 \cdot 10^{-3}$ mol) |
| C | p-Vinylphenylmethyldiethoxysilane | 0.71 g ($3.0 \cdot 10^{-3}$ mol) |
| D | N-(3-Triethoxysilylpropyl)-4,5-dihydroimidazole | 1.2 g ($4.5 \cdot 10^{-3}$ mol) |

Figure 1:
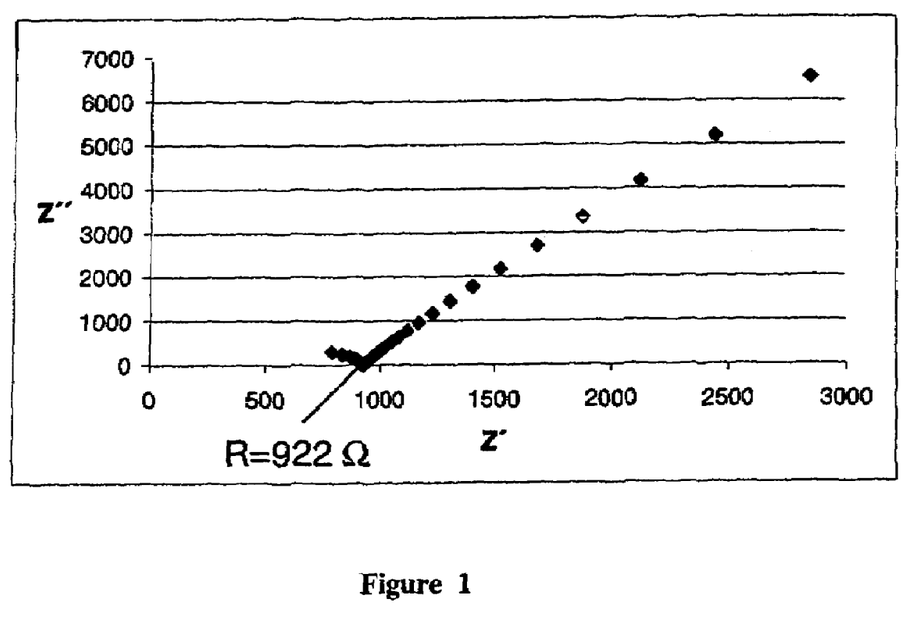
FIG. 1 shows a Nyquist diagram for a proton-conductive membrane made in Example 3 at room temperature.
Figure 2:
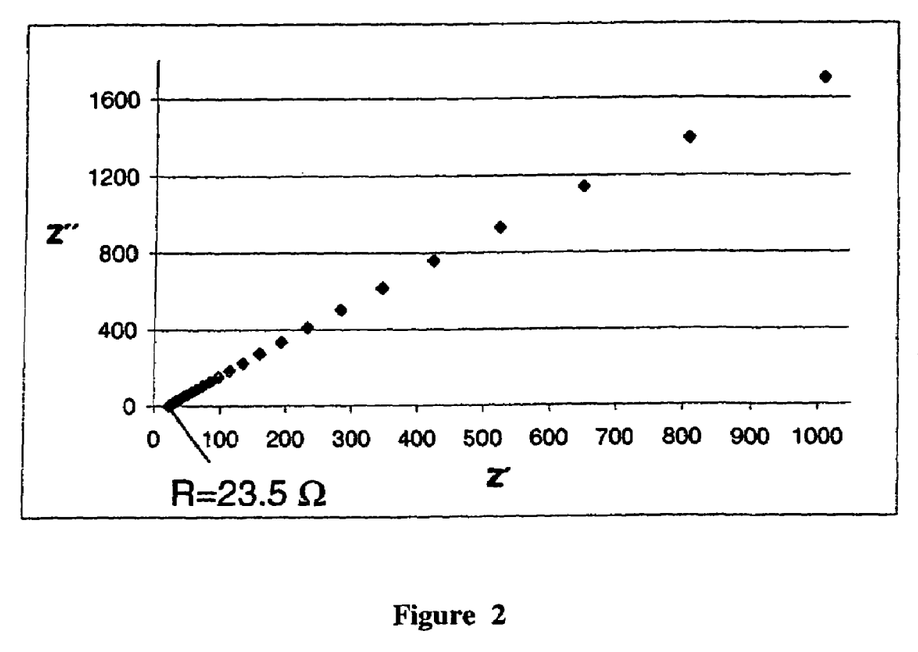
FIG. 2 show a Nyquist diagram for the same proton-conductive membrane of FIG. 1 at a temperature of 120° C.

In a first flask, components C, D and 2.4 g ($7.5 \cdot 10^{-2}$ mol) of methanol are mixed together at room temperature. Next, 0.17 g ($9.7 \cdot 10^{-3}$ mol) of water is added to this. After 24 hours, components A, B and 1.6 g ($5.0 \cdot 10^{-2}$ mol) of methanol are mixed together at room temperature and then 0.17 g ($9.7 \cdot 10^{-3}$ mol) of water is added. After another 24 hours, the two systems are mixed together. The batch is stirred for another 24 hours. Then 1.2 g ($1.8 \cdot 10^{-2}$ mol) of imidazole is added, and the solvent is removed (in a rotary evaporator). After being spun off, a moderately viscous resin is obtained that is hardened after application as a layer, e.g., on a Nafion film or as a membrane by introduction in a Teflon form into the furnace at 65° C. The conductivity is measured on a membrane tablet with a "Schlumberger frequency response analyzer 1260." The Nyquist diagram indicates the resistance of the sample. (FIG. 1) FIG. 1 shows a selected sample with a diameter of 1.15 cm and a thickness of 1.5 mm at room temperature. The resistance is 922Ω, with a conductivity of $1.6 \cdot 10^{-4}$ S/cm. The resistance at 120° C. is 23.5Ω, with an unexpectedly high conductivity of $6 \cdot 10^{-3}$ S/cm. This can be seen in the corresponding diagram, FIG. 2. The same composition, but without the addition of imidazole, results in a conductivity of $7.6 \cdot 10^{-7}$ S/cm at room temperature. If the sample is added to water instead of imidazole (absorption of 20%), then a conductivity of $2.2 \cdot 10^{-4}$ S/cm is achieved at room temperature.

Example 4

Production of a Proton-Conductive Membrane with a Different Composition

| | | |
|---|---|---|
| A | (3-Sulfonyl)-1-propenyltrimethoxysilane | 1.2 g ($5.0 \cdot 10^{-3}$ mol) |
| B | p-Vinylphenylmethyldiethoxysilane | 0.39 g ($1.7 \cdot 10^{-3}$ mol) |
| C | p-Vinylphenylmethyldiethoxysilane | 0.66 g ($2.8 \cdot 10^{-3}$ mol) |
| D | N-(3-Triethoxysilylpropyl)-4,5-dihydroimidazole | 0.46 g ($1.7 \cdot 10^{-3}$ mol) |

Figure 3:
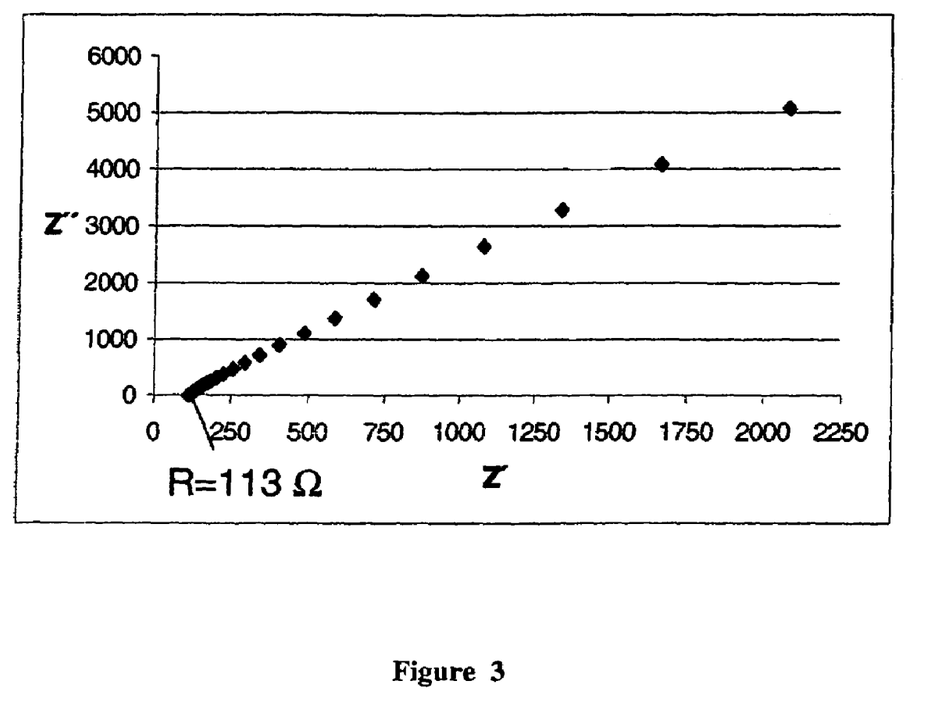
FIG. 3 shows a Nyquist diagram for a proton-conductive membrane made in Example 4 at room temperature.

This membrane was produced as in Example 3. The resistance of a selected sample (diameter: 1.15 cm, thickness: 0.12 cm) with a content of 1.02 g ($1.5 \cdot 10^{-2}$ mol) of imidazole is 113Ω, which results an unexpectedly high conductivity of $1.0 \cdot 10^{-3}$ S/cm at room temperature. The Nyquist diagram of this sample is shown in FIG. 3.

Example 5

Synthesis Route of Proton Conducting Inorganic-organic Membranes

Figure 4:
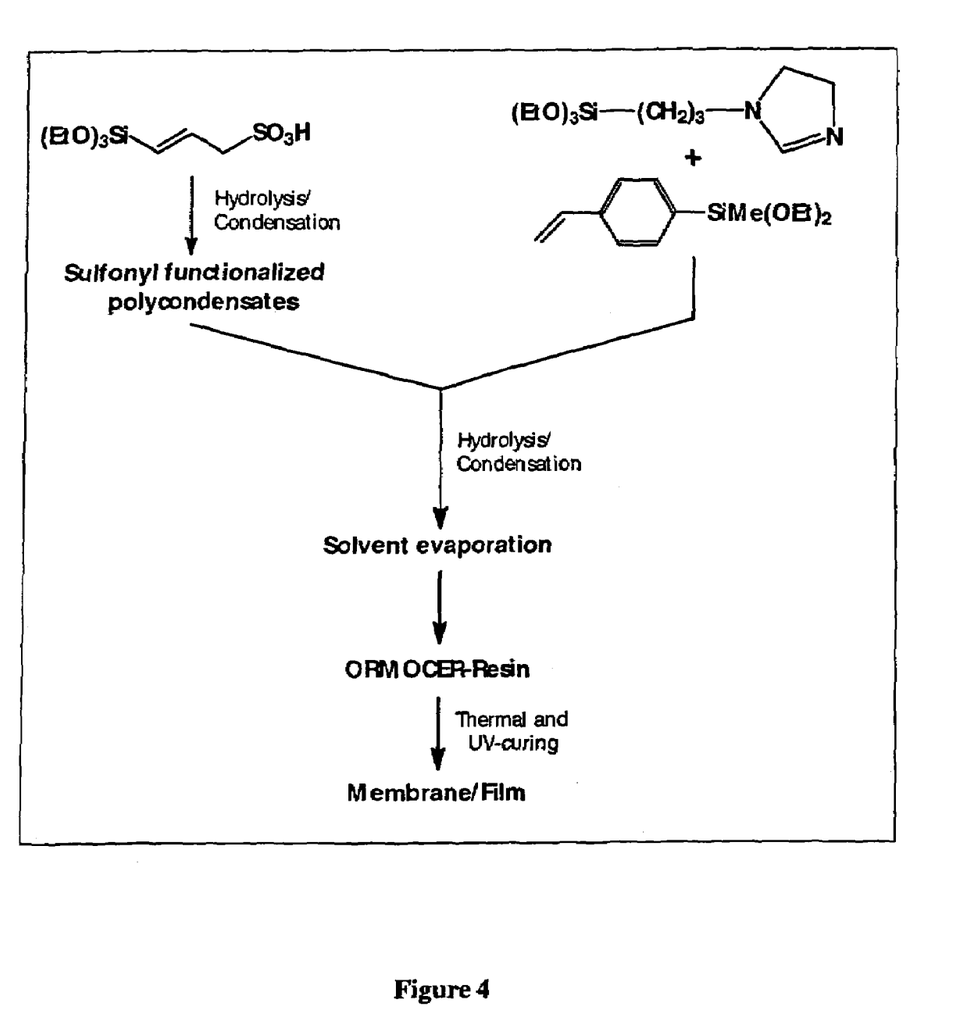
FIG. 4 depicts a synthesis scheme for proton conducting inorganic-organic membranes.

In the synthesis route of the scheme in FIG. 4, the sulfonated silane is first hydrolyzed and condensed. One day later, the styryl-functionalized alkoxysilane and the alkoxysilane containing at least a nitrogen heterocycle, an amino function or a sulfonamide function are added with the necessary amount of water for their hydrolysis and co-condensation. Following additional stirring (several days), the solvent is evaporated at 35° C. under vacuum and the resulting resin can be stored at −20° C.

The resin is cast in aluminum moulds or applied on a substrate as a film and both thermally and UV-cured. The thermally curing will allow not only to start the organic polymerization, but also to evaporate the residues of solvent. The conductivity of the sample can here also be enhanced either by water uptake or by adding imidazole to the sol before solvent evaporation. The synthesis route is further depicted in FIG. 4.

For example, the synthesis of a proton conducting membrane following the synthesis route of FIG. 4 comprises the following:

| | |
|---|---|
| Trimethoxysilylpropylsulfonic acid | 1.1 g ($4.5 \cdot 10^{-3}$ mole) |
| p-Vinylphenylmethyldiethoxysilane | 0.44 g ($1.9 \cdot 10^{-3}$ mole) |
| N-(3-triethoxysilylpropyl)-4,5-dihydroimidazole | 0.31 g ($1.1 \cdot 10^{-3}$ mole) |

Figure 5:
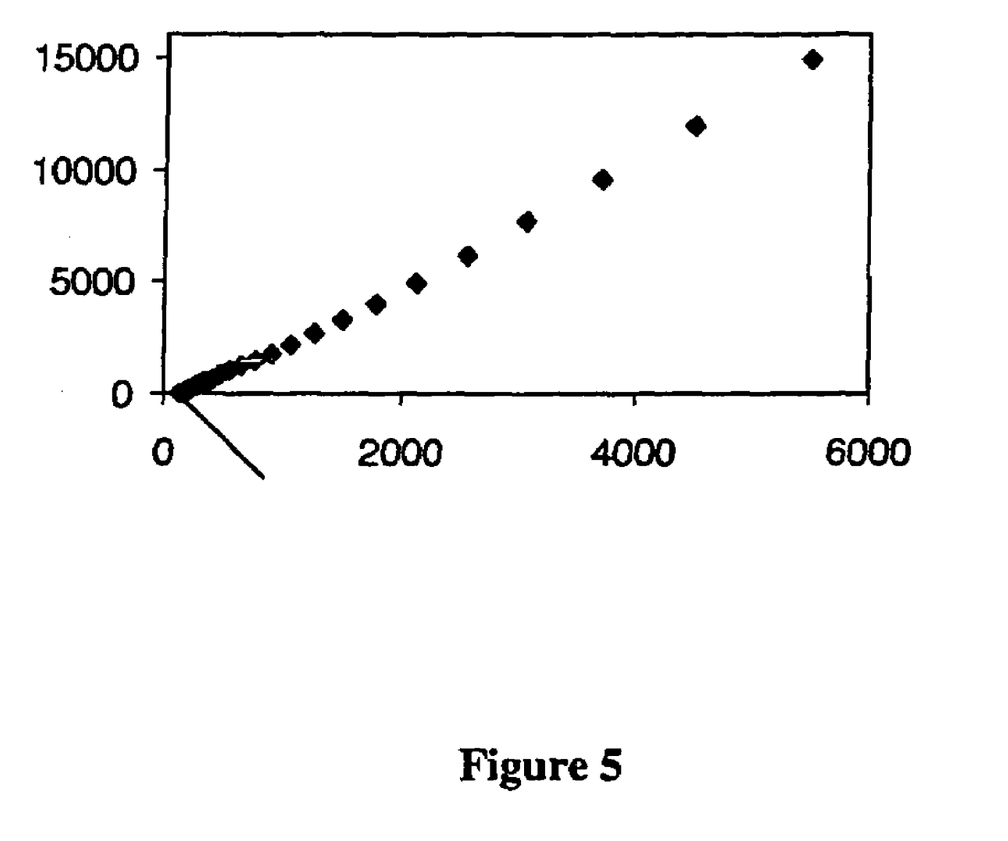
FIG. 5 shows a Nyquist diagram for a proton-conductive membrane made in Example 5 at room temperature.

In a first step trimethoxysilylpropylsulfonic acid and 1.4 g ($4.5 \cdot 10^{-2}$ mole) methanol were stirred at room temperature. Then 0.12 g ($6.7 \cdot 10^{-3}$ mole) of water was added. After 24 hours p-vinylphenylmethyldiethoxysilane, N-(3-triethoxysilylpropyl)-4,5-dihydroimidazole, 0.96 g ($3.0 \cdot 10^{-2}$ mole) methanol and $7.1 \cdot 10^{-2}$ g ($3.9 \cdot 10^{-3}$ mole) water were added. The reaction mixture was stirred for six days. Next, 0.95 g ($1.3 \cdot 10^{-2}$ mole) imidazole was added and the solvent was evaporated at 35° C. under vacuum. After the evaporation a middle viscous resin was obtained, a starter for the styrene UV-polymerization was added. The resin was cast in aluminum moulds or coated on a substrate like a Nafion®-foil, pre-baked at 70° C. for two hours and UV-polymerized for two minutes. The FIG. 5 shows the Nyquist-diagram at room temperature of a selected sample with a diameter of 1.15 cm and a thickness of 400 μm with a resistance of 145Ω. The sample has a conductivity of $2.7 \cdot 10^{-4}$ S/cm. At 115° C., a resistance of 3.9Ω was measured, and the sample had a conductivity of $1.0 \cdot 10^{-2}$ S/cm. FIG. 5 provides a Nyquist-diagram of an ORMOCER®/imidazole sample from the above synthesis route.

The invention claimed is:

1. A proton-conductive, organically cross-linked heteropolysiloxane, obtained by the following steps:
   (a) At least partially hydrolyzing and condensing
      (1) one or more sulfonic acid-group containing silane(s) having at least one group that can be cleaved under hydrolytic conditions,
      (2) one or more styryl-functionalized silane(s), and
      (3) one or more silane(s), selected from those carrying nitrogen-containing heterocyclic group, an amine group or a sulfonamide group, and having attached thereto at least one group that can be cleaved under hydrolytic conditions,
   wherein either the components (1), (2) and (3) are mixed before hydrolytic condensation, or mixing is performed during or after hydrolytic condensation of the components, and
   (b) Effecting an organic cross-linking between existing styryl groups.

2. The proton-conductive, organically cross-linked heteropolysiloxane according to claim 1, obtained by the following steps:
   (a') hydrolyzation and condensation, carried out at least partially, of one or more sulfonic acid group-containing silane(s) with at least one group that can be cleaved under hydrolytic conditions,
   (b') addition of one or more styryl-functionalized silane(s) and of one or more silane(s) that carry a nitrogen-containing heterocyclic group, an amine group or a sulfonamide group and have attached thereto at least one group that can be cleaved under hydrolytic conditions, to the (partial) hydrolyzate/(partial) condensate obtained in step (a'), and
   (c') continuation of hydrolyzation and condensation of the components of the mixture, whereby a silane resin composition is obtained, and
   (e') effecting an organic cross-linking between existing styryl groups.

3. The proton-conductive, organically cross-linked heteropolysiloxane according to claim 1, wherein the hydrolyzation and condensation steps are carried out in a suitable solvent, and after the end of hydrolysis and condensation, the solvent is removed or at least partially removed.

4. The proton-conductive, organically cross-linked heteropolysiloxane according to claim 1, wherein a substance that increases the proton conductivity is added prior to or after organic cross-linking between existing styryl groups.

5. The proton-conductive, organically cross-linked heteropolysiloxane according to claim 4, wherein the substance that increases the proton conductivity is imidazole.

6. The proton-conductive, organically cross-linked heteropolysiloxane according to claim 1, wherein a solvent for acid protons is added to the heteropolysiloxane, before or after the organic cross-linking between existing styryl groups is effected, said solvent for acid protons having the ability to increase the proton conductivity of the heteropolysiloxane.

7. The proton-conductive, organically cross-linked heteropolysiloxane according to claim 6, wherein the solvent for acid protons that has the ability to increase the proton conductivity of the heteropolysiloxane is water.

8. The proton-conductive, organically cross-linked heteropolysiloxane according to claim 7, wherein the water is added in the form of atmospheric moisture.

9. The proton-conductive, organically cross-linked heteropolysiloxane according to claim 1, wherein said proton-conductive, organically cross-linked heteropolysiloxane is in the form of a layer or membrane.

10. The proton-conductive, organically cross-linked heteropolysiloxane according to claim 9, wherein the organic crosslinking is effected only after the silane resin composition had been brought into the form of the layer or membrane.

11. The proton-conductive, organically cross-linked heteropolysiloxane according to claim 1, obtained by the following steps:
   (a") hydrolyzation and condensation, carried out at least partially, of a mixture (A) that consists of or that contains one or more sulfonic acid group-containing silane(s) with at least one group that can be cleaved under hydrolytic conditions, and one or more styryl-functionalized silane(s),
   (b") hydrolyzation and condensation, carried out at least partially, of a mixture (B) that consists of or that contains one or more silane(s) that carry a nitrogen-containing heterocyclic group, an amine group or a sulfonamide group and have attached thereto at least one group that can be cleaved under hydrolytic conditions, and one or more styryl-functionalized silane(s),
   (c") combination of mixtures (A) and (B) and optionally additional hydrolyzation and condensation of the mixture components, whereby a silane-resin composition is obtained, and
   (d") effecting an organic cross-linking between existing styryl groups.

12. The proton-conductive, organically cross-linked heteropolysiloxane according to claim 1, wherein
   (i) the sulfonic acid group-containing silane(s) is/are selected from silanes of formula (I):

$$P_a R^1_b SiX_{4-a-b} \qquad (I)(I)$$

wherein P has the meaning of $HOSO_2$—R, R comprises an aliphatic or aromatic organic radical, and P is bonded via the latter to silicon; $R^1$ represents a group that is bonded via carbon to silicon; X is a hydrolysis-sensitive group; a is 1 or 2; b is 0, 1 or 2; and a+b together are 1, 2 or 3.

13. The proton-conductive, organically cross-linked heteropolysiloxane according to claim 1, wherein
   (ii) the styryl group-containing silane(s) is/are selected from those of general formula (II):

$$(St)_a R^1_b SiX_{4-a-b} \qquad (II)$$

wherein (St) is a facultatively substituted styryl radical; $R^1$ represents a group that is bonded via carbon to silicon; X is a hydrolysis-sensitive group; a means 1, 2 or 3; b means 0, 1, or 2; and a+b together are 1, 2, or 3.

14. The proton-conductive, organically cross-linked heteropolysiloxane according to claim 1, wherein
(iii) the silane(s) that carries/carry at least one nitrogen-containing heterocyclic compound, an amine group or a sulfonamide group is/are selected from formula (III)

$$(Q)_a R^1_b SiX_{4-a-b} \qquad (III)$$

wherein $R^1$ represents a group that is bonded via carbon to silicon; X is a hydrolysis-sensitive group; a is 1 or 2; b is 0, 1 or 2; and a+b together are 1, 2 or 3; (Q) is Het-R— or $NH_2SO_2$—R— or $NHR_2$—R—, R comprises an aliphatic or aromatic organic radical, $R_2$ means hydrogen, and Het is a nitrogen-containing heterocyclic compound in the ring.

* * * * *